United States Patent [19]
Ahvenainen et al.

[11] Patent Number: 5,752,196
[45] Date of Patent: May 12, 1998

[54] MAINTAINING GROUP DATA IN A MOBILE COMMUNICATIONS SYSTEM

[75] Inventors: Jouko Ahvenainen; Anna Sillanpää, both of Helsinki, Finland

[73] Assignee: Nokia Telecommunications Oy, Espoo, Finland

[21] Appl. No.: 676,239
[22] PCT Filed: Nov. 21, 1995
[86] PCT No.: PCT/FI95/00640
  § 371 Date: Jul. 17, 1996
  § 102(e) Date: Jul. 17, 1996
[87] PCT Pub. No.: WO96/16519
  PCT Pub. Date: May 30, 1996

[30] Foreign Application Priority Data

Nov. 22, 1994 [FI] Finland ................... 945495

[51] Int. Cl.⁶ ..................... H04B 1/00
[52] U.S. Cl. ................... 455/518; 370/340
[58] Field of Search ................ 455/54.1, 54.2, 455/56.1, 518–520; 370/327, 340

[56] References Cited

U.S. PATENT DOCUMENTS

| | | | |
|---|---|---|---|
| 4,926,495 | 5/1990 | Comroe et al. | 370/327 X |
| 5,210,787 | 5/1993 | Hayes et al. | 455/33.2 X |
| 5,279,521 | 1/1994 | Johlie et al. | 455/56.1 |
| 5,307,400 | 4/1994 | Sawyer et al. | 379/60 X |
| 5,392,278 | 2/1995 | Teel et al. | 370/341 X |
| 5,408,419 | 4/1995 | Wong | 455/33.1 X |
| 5,428,822 | 6/1995 | Helenius et al. | 455/54.1 |
| 5,548,804 | 8/1996 | Rosenlund | 455/56.1 X |

FOREIGN PATENT DOCUMENTS

| | | |
|---|---|---|
| 473 355 | 3/1992 | European Pat. Off. . |
| 20524 | 10/1993 | WIPO . |
| 13686 | 5/1995 | WIPO . |

OTHER PUBLICATIONS

MPT 1343, Performance Specification: System Interface Specification for radio units to be used with commerical trunked networks operating in Band III sub–bands 1 and 2, Jan. 1988, revised Sep. 1991.

MPT 1327, A Technical Overview of the United Kingdom PMR Trunking Standards, date unknown.

*Primary Examiner*—Thomas Mullen
*Attorney, Agent, or Firm*—IP Group of Pillsbury Madison & Sutro LLP

[57] ABSTRACT

A method and a mobile communications system for maintaining group data relating to a communication group in a mobile communications system including a plurality of exchanges. To optimize the management of group data, one of the exchanges is selected as a main exchange, in the database of which a master copy of group data of the communication group is maintained. Information is maintained in the database of the selected main exchange on exchanges of a fixed distribution area. The group data are stored in the databases of these exchanges irrespective of the location of the subscribers. Information is maintained on exchanges of an enlarged distribution area. The group data are stored in these exchanges if subscribers belonging to the communication group register under the exchanges. Information is maintained on exchanges of a current enlarged distribution area. Subscribers of the communication group are currently registered under these exchanges. The group data are stored in the databases of exchanges of the fixed distribution area, and the group data are stored in the databases of exchanges of the current enlarged distribution area.

6 Claims, 1 Drawing Sheet

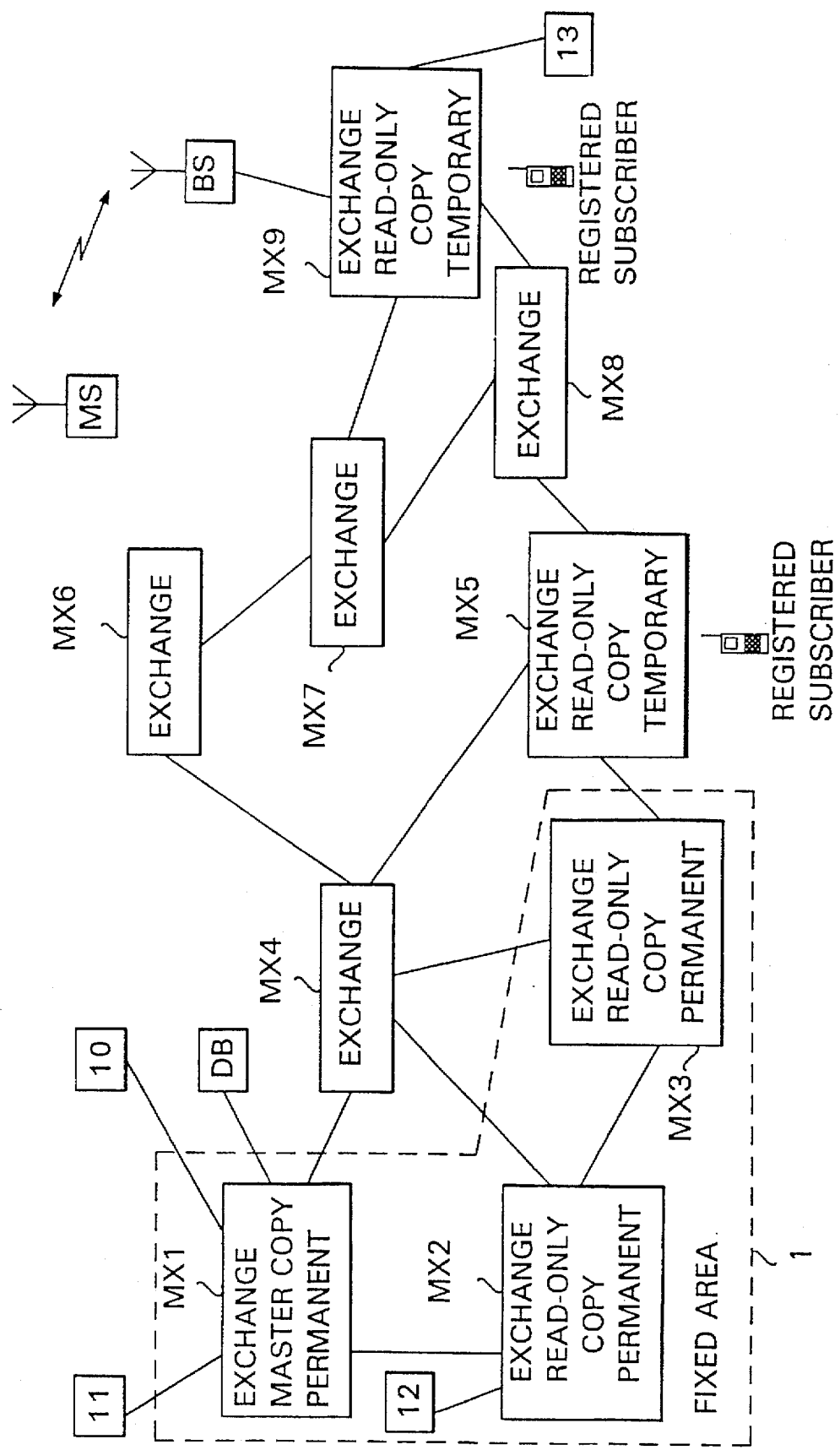

MAINTAINING GROUP DATA IN A MOBILE COMMUNICATIONS SYSTEM

This application claims benefit of international application PCT/FI95/00640, filed Nov. 21, 1995.

FIELD OF THE INVENTION

The invention relates to a method for maintaining group data relating to a communication group in a mobile communications system comprising a plurality of exchanges having connection through base stations with subscribers at least some of which belong to the communication group, said exchanges incorporating databases.

The invention relates to a mobile communications system in which group communication is to be established when the subscribers are located in the service areas of several exchanges.

BACKGROUND OF THE INVENTION

The invention is specifically intended for use in what are known as trunked networks, which are typically networks of companies or authorities wherein all channels are shared by one or several user organizations. In such networks, the subscribers have individual subscriber numbers and also group numbers indicating the communication group or subscriber group the subscriber belongs to, thus enabling communication intended for members of a given group to be switched to subscribers of that group.

The invention is suitable to be used in mobile communications networks with digital as well as analog radio paths. Digital mobile communications systems may be, for example, in accordance with the TETRA (=Trans European Trunked Radio) standard. Analog mobile communications systems have been described, for instance in MPT 1327, *A Signalling Standard for Trunked Private Land Mobile Radio Systems*, January 1988, revised and reprinted November 1991, and MPT 1343, *Performance Specification*, January 1988, revised and reprinted September 1991, United Kingdom Department of Trade and Industry, Radiocommunications Agency.

An essential characteristic of the above mobile communications systems, for example, is that it is possible and desired to implement group communication involving several subscribers therein. Group communication is all-informed communication within predefined groups. Groups are used, for example, to emulate open-channel type of operation or to enable group calls.

In group communication an entire group is addressed by a single calling number. An individual mobile station (e.g. a radio telephone), i.e. subscriber, can belong to several groups that are programmed into the mobile station. The system maintains a data file on the base stations associated with each group number. Group communication can include one, several or all base stations in the service area of a radio telephone exchange or mobile exchange, and also a number of mobile exchanges. In establishing a group call, a traffic channel is allocated at all base stations associated with the group, and each of these base stations sends a group call message, including the group number and information on the traffic channel allocated. If the mobile station recognizes the group number included in the group call message, it switches to the traffic channel indicated in the group call message. Hence, in principle, the mobile station is always available for a group call if it is located within the predetermined operational area of the group, where it is also paged for participation in the call.

Group communication is normally a characteristic of networks intended for special applications. As a rule, such networks have not comprised several exchanges. Furthermore, conventionally it has been possible for example to reserve the service area of one exchange as the area for establishing the group communication. The recent expansion in size of mobile communications systems has resulted in establishment of group communication extending to the service areas of several exchanges, and hence it has become problematic how to maintain group data for group communication established in the service areas of several exchanges.

The group data for a communication group comprise all data relating to a given group. These data include group-related data needed for establishing group communication. The group data include for instance the permitted establishing area for the group communication and the communication rights of the group. The group data may include the following data:

1. Group type, indicates the kind of the group concerned. The type may be for example fixed or shifting.
2. Group minimum area, indicates the base stations in whose areas group communication is established. This information does not necessarily indicate the base stations in whose areas group communication is currently established.
3. Group maximum shifting area, indicates the base stations to the areas of which the group communication can extend.
4. Group real shifting area, indicates the exchanges and base stations in whose areas group communication is established in accordance with current subscriber registrations.
5. Group subscribers, list of subscribers belonging to the group.
6. Priority base stations, base stations that must be included in the communication before the communication is started.
7. Priority level of group.
8. Pre-emptive priority by means of which communication can be established by allocating resources of other communication using preemption, even though such resources are being used by other communication.
9. Encryption data.
10. List of fixed control points.
11. List of default values.

In small networks, these group data can be distributed to, i.e. copied into, all exchanges. In that case, however, the network cannot include very many exchanges, and a large number of separate groups is not possible as the amount of data to be copied into the exchanges will be very large. In the prior art approach, one exchange has always distributed the data to all other exchanges. With the increase in the amount of data to be copied and in the number of "target" exchanges, also copying and updating to be performed increases.

The group communication area may be fixed or shifting, or a combination of these. This also places demands on group data management. One requirement is that the group data management should be dynamic and have maximum efficiency.

In public mobile communications systems, such as the GSM system, the data of an individual subscriber may be stored in home and visitor location registers, i.e. HLR and VLR databases. In that situation, each subscriber has a fixed HLR database in which his or her data are stored, and the subscriber data are copied into the VLR database of an exchange when the subscriber roams in the network within the service area of that exchange. Hence, the data of the subscriber are copied into the VLR database of the exchange in whose service area the subscriber is located.

Maintenance of global data, i.e. all data, everywhere in the extensive network, i.e. maintenance of all data for the group in all exchanges, is a very cumbersome and costly solution and requires very large databases the continual updating of which will place a heavy load on the network.

Some of the communication groups may have a fixed area in which the communication is always established. Furthermore, the area may be dependent on the location of the subscribers. In that case, for instance the maintenance of data in the visitor databases of the exchanges of the fixed area on the basis of the location of the subscribers is unnecessary, since the communication is established in the relevant area irrespective of the location of the subscribers. Furthermore, creation and erasure of visitor databases in accordance with the movements of the subscribers unnecessarily loads the system.

SUMMARY OF THE INVENTION

It is an object of the present invention to enable rapid availability of group data to exchanges in which group communication is established. This is to be implemented in such a manner that the set-up time for the group communication to be established is as short as possible in all exchanges in whose service areas group communication is established. This is further to be implemented in such a way that the data connections and disk and memory space utilization have maximum efficiency. The invention aims at maintenance of data relating to the communication group and easy access to the data by communication-establishing exchanges in a system having databases distributed to different parts of the network. The objective is to implement a suitable database system in which the group data are located such that they are easy to manage and rapidly accessible by the exchanges needing the data.

This novel method for maintaining group data relating to a communication group in a mobile communications system is achieved with a method in accordance with the invention, which is characterized by selecting one of the exchanges as a main exchange in the database of which a master copy of the group data of the communication group is maintained, maintaining information in the database of the selected main exchange on exchanges of a fixed distribution area, the group data being stored in the databases of these exchanges irrespective of the location of the subscribers, on exchanges of an enlarged distribution area, the group data being stored in these exchanges if subscribers belonging to the communication group register under the exchanges, and on exchanges of a current enlarged distribution area, subscribers of the communication group being currently registered under these exchanges, storing the group data in the databases of exchanges of the fixed distribution area, and storing the group data in the databases of exchanges of the current enlarged distribution area.

The invention further relates to a mobile communications system comprising a plurality of exchanges having connection through base stations with subscribers at least some of which belong to a communication group, the exchanges incorporating databases.

The mobile communications system of the invention is characterized in that it comprises means for maintaining a master copy of group data relating to the communication group in a database, means for maintaining information on exchanges of a fixed distribution area in the database of a selected main exchange, the group data being stored in the databases of the exchanges of the fixed distribution area irrespective of the location of the subscribers, for maintaining information on exchanges of an enlarged distribution area in the database of the selected main exchange, the group data being stored in the databases of the exchanges of the enlarged distribution area if subscribers belonging to the communication group register under exchanges of the enlarged distribution area, and for maintaining information on exchanges of a current enlarged distribution area, subscribers of the communication group being registered under the exchanges, means for storing the group data in the databases of exchanges of the fixed distribution area, and means for storing the group data in the databases of exchanges of the current enlarged distribution area.

The invention is based on the idea that the database system of a mobile communications system stores a master copy of data on a communication group, having defined therein a fixed distribution area and an enlarged distribution area that expands according to need. The database also stores information on the current distribution area. The defined distribution areas may be changed as necessary, but the current enlarged distribution area may also change communication-specifically in accordance with the movements of the subscribers. The master copy of the group data defined in the system is stored in a fixed location. All updates to the data are made in the master copy, which immediately distributes them to the copies of the group data stored in other desired exchanges. The copies to be distributed and updated are those of the defined distribution area and those of the enlarged distribution area, which expands as necessary. A distribution area to which read-only copies of the data are distributed is defined in connection with the data. Also this distribution area can be changed as necessary. Furthermore, a read-only copy of the data can be made outside the distribution area determined on the basis of the movements of the subscribers of the group. These copies outside the defined area are only stored in exchanges currently having registered subscribers of said group. Modified data are updated in these copies in exchanges outside the actual distribution area as well.

The novel feature of the invention is a dynamic distribution area and its updating in real time. The idea is that group data need not be retrieved callspecifically from the actual home exchange, and also the fact that the group data are not distributed to the area of the entire network but to group-specifically defined exchanges and, as necessary, to exchanges currently holding registered subscribers belonging to a respective group or registered with that group. Each group has such a defined home exchange incorporating group data and being responsible for distribution and updating of data in the copies of the group data in the other exchanges.

It is an advantage of such a method for maintaining group data relating to a communication group in a mobile communications system that in accordance with the invention there is no need to maintain the data globally in all exchanges of the entire network, but the data are distributed in the network only as necessary. Maintenance of the data and database memory space requirement are designed in accordance with the actual need. Hence, the data are maintained permanently in exchanges in whose service areas group communication is to be established in any case, and temporarily in exchanges under which subscribers of the group temporarily register.

It is another advantage of the invention that when the procedure in accordance with it is followed, there is no need to monitor the subscribers for creating subscriber visitor data, i.e. group data, in exchanges in whose service areas group communication is established in any case. The procedure is based on monitoring subscribers and copying group data only in those exchanges in which this is necessary. This is an advantageous solution in view of network loading, database space requirement and speed of data acquisition.

It is a further advantage of the invention that it enables fast establishment of group communication. The data are locally available where they are needed.

It is still another advantage of the invention that it is readily adaptable to small and large networks. For example, with small networks a fixed area including all exchanges of the network can be created with the inventive solution. This corresponds to the conventional global data model in small networks. On the other hand, in accordance with the invention large networks can permanently store and update data in those exchanges only in which the data are likely to be needed. Hence, if the data are needed by other exchanges as well, the data can be temporarily maintained also in exchanges outside the fixed area.

It is still another advantage of the invention that maintenance of data is intelligible when updates are made at one location. Thus no complex methods are necessary for updating and amending inconsistent data.

It is a further advantage of the invention that it is reliable also in fault situations. The data can be accessed by several exchanges locally, and hence faults in data connections or faults in individual equipment entities normally do not prevent communication establishment, except perhaps locally in a single exchange.

BRIEF DESCRIPTION OF THE DRAWINGS

The invention will be explained in the following with reference to the accompanying drawing, in which:

FIG. 1 is a block diagram representation of a mobile communications system of the invention.

DETAILED DESCRIPTION OF A PREFERRED EMBODIMENT OF THE INVENTION

FIG. 1 shows exchanges MX1–MX9 in a mobile communications system. Exchange MX1 has been selected as a main exchange in whose database a master copy of the group data of a communication group and information on exchanges MX1–MX3 of a fixed distribution area are maintained. The desired group data are stored in the databases of the exchanges of the fixed distribution area irrespective of whether subscribers capable of participating in the group call are located in the service areas of these exchanges or not.

The exchanges of the mobile communications system may also refer to intelligent base stations incorporating switching means for switching calls and a database for maintaining group data.

In the system of the invention, the master copy of the group data is stored in one database incorporated in the exchange. In this case, this "main exchange" is exchange MX1. For example exchanges MX1–MX3 of the fixed establishing area of the group call may have been defined as the subscriber-independent data distribution area. Furthermore, the data is copied into an exchange located outside the distribution area if a subscriber registered with the group registers under said exchange. In this case, copies have been distributed to exchanges MX5 and MX9 having registered subscribers belonging to the group. The copy is deleted from the database of each of these exchanges MX5, MX9 if the relevant exchange no longer holds any subscribers registered with the group.

In the method of the invention, the data are updated in the master copy in exchange MX1. The database storing the master copy distributes the data to all current read-only copies. A temporary read-only copy is created by copying the data from the master copy when a subscriber registered with the group registers under an exchange not previously storing the data. The temporary read-only copy is deleted when the last registered subscriber has left the exchange.

When a group call is established, an exchange searches for the data in its database at first. If the data are not stored in the database of the exchange, they are retrieved from the master copy. Normally, however, the information should be in store in the databases of the exchanges in which the call is to be established, as the data have been copied into the databases of the exchanges when the subscribers have registered under them.

Hence, the invention relates to a distributed data management system for group data of a communication group in a mobile communications system. The data management system comprises a fixed master copy of the data, read-only copies of the data for the fixed area, and temporary read-only copies of the data to be created in accordance with the movements of the subscribers.

The invention relates to a database system managing group data in a mobile communications network in which it is possible to establish group calls under adherence to predefined rules. The group data correspond to subscriber data, but subscribers may be located simultaneously in the service areas of several different exchanges, and the contents of group data differ to some extent from the contents of subscriber data. A communication group includes several subscribers, and the group may also have a specific fixed area in the exchanges of which the call is established in any case. In that case, exchanges of a fixed distribution area are concerned.

The creation and deletion of temporary read-only copies should preferably be based on current registrations of subscribers under the exchanges, but there is also a given delay in the deletion of data. This ensures that the necessary correct information will be available and unnecessary information will not be stored for long periods of time in the database. The delay is preferable in order to avoid unnecessary loading in situations where, for instance, the subscriber removes the group from its list of active groups for a moment, but soon resumes it, or if the subscriber moves from the boundary of the service area of an exchange temporarily to the service area of another exchange, but then returns to the service area of the previous exchange.

The data should preferably be updated in the local copy, which will forward the updates to the master copy. Thus, the database system can handle access to the master copy and deal with possible fault situations, and it is not necessary for all those who make updates in the database to handle the situation themselves.

The invention also relates to a mobile communications system comprising a plurality of exchanges MX1–MX9 having connection through base stations BS with subscribers at least some of which belong to a communication group, the exchanges MX1–MX9 incorporating databases DB. The mobile communications system in accordance with the invention comprises means 10 for maintaining a master copy of group data relating to the communication group in database DB. The mobile communications system in accordance with the invention further comprises means 11 for maintaining information on exchanges MX1–MX3 of a fixed distribution area 1 in the database DB of a selected main exchange MX1, the group data being stored in the databases of the exchanges MX1–MX3 of the fixed distribution area 1 irrespective of the location of the subscribers MS, for maintaining information on exchanges MX4–MX9 of an enlarged distribution area in the database DB of the selected main exchange MX1, the group data being stored in the databases of the exchanges MX4–MX9 of the enlarged distribution area if subscribers MS belonging to the communication group register under the exchanges MX4–MX9 of the enlarged distribution area, and for maintaining information on exchanges MX5, MX9 of a current enlarged distribution area, subscribers MS of the communication group being registered under the exchanges MX5, MX9.

The mobile communications system in accordance with the invention further comprises means 12 for storing the group data in the databases of exchanges of the fixed distribution area.

The mobile communications system in accordance with the invention further comprises means 13 for storing the group data in the databases of exchanges MX5, MX9 of the current enlarged distribution area.

It is to be noted that the above described means may be incorporated in any network element of the mobile communications system.

The invention places no constraints on the detailed implementation of the databases. The databases may for example be fixedly incorporated in the exchange, but they may also be separate entities connected to the exchange.

Decisions on creation and deletion of temporary read-only copies in the exchanges of the enlarged distribution area can be made in different ways. The decisions can be made either on the basis of subscriber registrations only, or additionally observing the changes in the group registrations of the subscribers, i.e. whether a given subscriber belongs to a group or not. A subscriber may at any time register with a group or remove his or her registration, and thus if the situation is checked only when the subscriber registers under an exchange or leaves it, the data are not necessarily up-to-date. In that situation, various delays may also be employed, and thus the group data are deleted for instance after a time-out from the time subscribers belonging to the group are found to have left the exchange.

The data can be updated in the master copy at least in two ways. The updates can be made in the read-only copy stored in the exchange under which the subscriber is registered. The database system transfers the updates to the master copy, which further updates the other read-only copies. Another alternative is that each exchange always makes the updates directly to the master copy, which updates all read-only copies.

The drawings and the description relating to them are only intended to illustrate the idea of the invention. The method for maintaining group data in a mobile communications system and the mobile communications system in accordance with the invention may vary in their details within the scope of the claims. Even though the invention has been described in the above primarily in the context of radio telephone systems, the invention can be employed in other mobile communications systems as well, such as the GSM mobile communications system and the like.

We claim:

1. A method for maintaining group data relating to a communication group in a mobile communications system comprising a plurality of exchanges having connection through base stations with subscribers at least some of which belong to said communication group, said exchanges incorporating respective databases, said method comprising the steps of:

selecting one of said exchanges as a main exchange in the database of which a master copy of group data of the communication group is maintained;

maintaining information in the database of said selected main exchange:

on exchanges of a fixed distribution area, said group data being stored in the databases of these exchanges irrespective of the location of the subscribers, on exchanges of an enlarged distribution area, said group data being stored in these exchanges if subscribers belonging to said communication group register under said exchanges, and on exchanges of a current enlarged distribution area, subscribers of said communication group being currently registered under these exchanges;

storing said group data in the databases of the exchanges of said fixed distribution area; and storing said group data in the databases of the exchanges of said current enlarged distribution area.

2. A method as claimed in claim 1, wherein:

if a subscriber belonging to the communication group registers under an exchange of said enlarged distribution area and if the database of said exchange of said enlarged distribution area does not hold group data of said communication group, said exchange of said enlarged distribution area requests the group data from the main exchange of the communication group, which said main exchange sends said requested group data to said exchange of said enlarged distribution area and inserts the data relating to said exchange of said enlarged distribution area into the information on exchanges of the current distribution area stored in its database.

3. A method as claimed in claim 1, wherein:

if a subscriber registered under an exchange of said enlarged distribution area registers with a communication group on which no group data are stored in the database of said exchange of said enlarged distribution area, said exchange of said enlarged distribution area requests the group data for said communication group from said main exchange which sends said requested group data to said exchange of said enlarged distribution area and inserts the data relating to said exchange into the information on exchanges of the current distribution area stored in its database.

4. A method as claimed in claim 1, wherein:

if the only subscriber belonging to said communication group who is registered under an exchange of said current enlarged distribution area leaves the service area of said exchange of said current enlarged distribution area or removes registration with said group, the group data for said communication group are deleted from the database of said exchange of said current enlarged distribution area, and the information on said exchange of said current enlarged distribution area is deleted from the information relating to exchanges of said current enlarged distribution area stored in the database of said main exchange.

5. A method as claimed in claim 1, wherein:

when said group data change, said group data are updated in the database of said main exchange, wherefrom said group data are further updated into the databases of the exchanges of said fixed distribution area and the databases of the exchanges of said current enlarged distribution area.

6. A mobile communications system, comprising:

a plurality of exchanges having connection through base stations with subscribers at least some of which belong to a communication group, said exchanges incorporating databases;

means for maintaining a master copy of group data relating to said communication group in a database;

means for maintaining information on exchanges of a fixed distribution area in the database of a selected main exchange, said group data being stored in the databases of the exchanges of said fixed distribution area irrespective of the location of the subscribers;

means for maintaining information on exchanges of an enlarged distribution area in the database of said selected main exchange, said group data being stored in the databases of the exchanges of said enlarged distribution area if subscribers belonging to said communication group register under exchanges of said enlarged distribution area; and means for maintaining information on exchanges of a current enlarged distribution area, subscribers of said communication group being registered under these exchanges;

means for storing said group data in the databases of the exchanges of said fixed distribution area; and means for storing said group data in the databases of the exchanges of said current enlarged distribution area.

* * * * *